United States Patent Office 3,597,352
Patented Aug. 3, 1971

3,597,352
SCALE INHIBITORS
James R. Stanford and Paul G. Vogelsang, Jr., Houston, Tex., assignors to Nalco Chemical Company, Chicago, Ill.
No Drawing. Filed Nov. 2, 1967, Ser. No. 680,028
Int. Cl. C09k *3/00;* E21b *31/00*
U.S. Cl. 252—8.55                              10 Claims

ABSTRACT OF THE DISCLOSURE

Phosphated surface active hydroxy amines obtained by reacting polyphosphoric acid and/or phosphorus pentoxide with surface active hydroxyamines, e.g., $C_8$ to $C_{18}$ amines, with or without one or more hydroxy hydrocarbons, with or without neutralization, are used as scale inhibitors in brines, especially in oil wells, where calcium and barium salts are present.

---

The invention is concerned with the prevention of hardness scale deposits on metal surfaces in contact with hard water containing hardness scale-forming ions and with the preparation of compounds or compositions which are effective for this purpose. In particular, the invention is concerned with scale prevention in natural brines on ferrous metal walls and other surfaces in oil producing and waterflood systems.

Inorganic polyphosphates have long been the most effective and economical sequestering agents used for the prevention of alkaline deposits in both oil producing and water flood systems. However, due to the problems encountered in feeding inorganic polyphosphates and their incompatibility with many waters, a need for a liquid organic phosphate with good solubility in waters containing hardness ions has become increasingly evident. For this reason, a liquid product with good solubility in produced waters and having the effectiveness and low treating cost of inorganic polyphosphates is needed.

One of the objects of the present invention is to provide new and improved compounds and compositions which will supply this need. Other objects will appear hereinafter.

In accordance with the invention it has been found that phosphated surface active hydroxy amines, e.g., $C_8$–$C_{18}$ amines with or without one or more hydroxy hydrocarbons, with or without neutralization, are effective scale inhibitors in inhibiting scale deposits on metal surfaces in contact with hard water containing hardness scale-forming ions and especially in inhibiting scale produced by natural brines, such as those found in underground formations, as, for example, in oil wells.

In the practice of the invention the phosphated surface active hydroxy amine, with or without one or more hydroxy hydrocarbons, or a neutralization product thereof is introduced into hard water or brine which is contacted with metal surfaces while maintaining a hardness-ion-precipitation-preventing quantity in the order of 0.5 to 100 parts per million (p.p.m.) of the active effective compounds.

The products provided for the purpose of the invention can be described as polyphosphoric acid esters of surface active hydroxy amines or mixed polyphosphoric acid esters of surface active hydroxy amines and one or more hydroxy hydrocarbons. They are preferably prepared by reacting the hydroxy amine, with or without one or more hydroxy hydrocarbons, with polyphosphoric acid and/or phosphorus pentoxide at elevated temperature, preferably in the order of about 50° C. to 175° C., although somewhat higher temperatures on the order of 200° C. to 250° C. can sometimes be used, depending upon the nature of the surface active hydroxy amine reactant. In the early stages, the reaction is exothermic and care must be taken to control the temperatures. The reaction time is preferably at least about 30 minutes. The reaction may be conducted for a longer period, however, e.g., up to three to five hours, to assure complete reaction. If desired, a catalyst, such as boron trifluoride etherate complex, may be used. When using polyphosphoric acid, the surface active hydroxy amine, with or without one or more hydroxy hydrocarbons, can be added to the polyphosphoric acid liquid. Conversely, the phosphoric acid can be added to the surface active hydroxy amine, with or without one or more hydroxy hydrocarbons.

The resultant reaction product may be used as is, or it may be converted to a salt by partial to complete neutralization with an alkaline substance such as, for example, potassium or sodium hydroxide, potassium or sodium carbonate, ammonia, or a basic amino compound, e.g., tetramethyl ammonium hydroxide, methylamine, ethylamine, diethylamine, triethanolamine, diethanolamine, triethyl amine, ethylene diamine, diethylene triamine, pyridine, morpholine or other amine. The amine should preferably be a water soluble amine or at least one that does not destroy solubility in water.

The surface active amines should contain at least 8 carbon atoms in a hydrocarbon chain. They are preferably obtained by oxyalkylating surface active amines. They can also be obtained by reacting low molecular weight water soluble amines with a long chain epoxide containing at least eight carbon atoms. They can be monoamines or polyamines. They can have a single hydroxy group but preferably have a plurality of hydroxy groups. The oxyalkylated amines are obtained by reacting an alkylene oxide, for example, ethylene oxide or 1,2-propylene oxide, with a surface active amine containing one or more reactive hydrogen atoms. The preferred amines contain at least one 2-hydroxy ethyl group (—$CH_2CH_2OH$) provided by oxyethylation. The primary hydroxyl groups thereof are more effective than the secondary hydroxyl groups which would be provided by oxypropylation

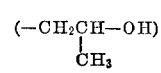

However, oxypropylation may be used if the oxypropylated product is then oxyethylated to provide terminal 2-hydroxyethyl groups. A $C_{10}$–$C_{14}$ alkyl amine (e.g., cocoamine), for example, can be oxyethylated with two moles of ethylene oxide per mole of amine to produce a surface active amine containing two 2-hydroxyethyl groups. By using both ethylene oxide and 1,2-propylene oxide, products can be obtained with both hydroxyethyl and hydroxypropyl groups. The extent of the oxyalkylation can also be increased by increasing the number of moles of alkylene oxide and in some cases, it is desirable to use as many as thirty moles of alkylene oxide per mole of amine. In general, however, this is not necessary for the purpose of the invention. Mixtures of surface active hydroxyamines and other hydroxyamines can be used. Other amines which can be oxyalkylated to provide hydroxy amines are ethylene diamine, diethylenetriamine, triethylenetetraamine and tetraethylene pentamine. It is normally desirable that the hydroxy group which is to be phosphated should be separated from the nitrogen atom by at least one carbon atom and preferably by at least two carbon atoms as in the 2-hydroxyethyl group. Amines of this general structure are sometimes referred to as hydroxyalkyl amines or alkanolamines.

The hydroxy hydrocarbons which can be employed in conjunction with the surface active hydroxy amines and/or non-surface active hydroxy amines are, for example, monohydric alcohols or polyols, preferably containing at least one 2-hydroxyethyl group provided by oxyethylation. The primary hydroxyl groups thereof are more reactive than the secondary hydroxyl groups which would be provided by oxypropylation. However, oxypropylation can be used if the oxypropylated product is then oxyethylated to provide terminal 2-hydroxyethyl groups. Moreover, the reactive hydroxyl groups can be provided by using a long chain epoxide, for example, one containing at least 8 carbon atoms in the chain. Such compounds can also contain oxygen groups in the chain. In addition, monohydric oxyalkylated surface active agents having a terminal 2-hydroxyethyl group can be used.

Preferred embodiments include those in which said polyol is derived by oxyethylation of glycerol with 1.5 to 2.5 moles of ethylene oxide per mole of glycerol; those in which said polyols are derived by the oxyethylation of sorbitol with about 2–20 moles of ethylene oxide per mole of sorbitol; those in which said polyol is derived by the oxyethylation of trimethylolpropane with 1.5 to 2.5 moles of ethylene oxide per mole of trimethylolpropane; those in which said monohydric surface active agent is derived by the oxyethylation of alkyl phenols, e.g., containing 4 to 12 carbon atoms in the alkyl group or groups, preferably nonyl phenol or dinonyl phenol or mixtures thereof, or primary alcohols containing 6 to 18 carbon atoms, preferably tridecyl alcohol, or mixed 6–10 carbon atoms alcohols, with 2–20, preferably 4–14 moles of ethylene oxide per mole of such monohydric substance.

The products can consist of mixed phosphate esters and mixtures of phosphate esters of: surface active hydroxy amines; surface active hydroxy amines and non-surface active hydroxy amines; surface active hydroxy amines and surface active and/or non-surface active hydroxy hydrocarbons; surface active hydroxy amines, non-surface active hydroxy amines and/or surface active or non-surface active hydroxy hydrocarbons.

The resultant phosphate esters have an average of at least one and up to all of the hydroxyls of the surface active hydroxy amine replaced by phosphate ester groups derived from pholyphosphoric acid or phosphorus pentoxide, said phosphate ester groups consisting essentially of one or both of a member selected from the group consisting of

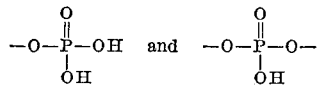

As previously indicated, the compounds provided by the invention include not only the free esters but also the salts of the esters derived by the partial to complete neutralization of the phosphate ester groups.

The invention will be further illustrated but is not limited by the following examples in which the quantities are stated in parts by weight unless otherwise indicated.

EXAMPLE I 300 parts of oxyethylated $C_{10}$–$C_{14}$ alkylamine made by reacting 2 moles of ethylene oxide with 1 mole of cocoamine was added to the reaction vessel. 15 parts of 99% acetic acid was added and mixed for 15 minutes. Then 180 parts of polyphosphoric acid was added gradually with agitation while keeping the temperature of the reaction mixture to below 100° C. When all the acid was added the temperature was held at 100° C. for 30 minutes.

EXAMPLE II

The procedure was the same as in Example I except that 210 parts of 99% acetic acid was employed instead of the 15 parts used in Example I.

EXAMPLE III

The procedure was the same as in Example I except that 100 parts of n-propyl alcohol was employed instead of the 15 parts of 99% acetic acid. The resultant product was cooled to 88° C. and was then mixed with 100 parts of n-propanol and 300 parts water.

EXAMPLE IV

The procedure was the same as in Example III except that 100 parts of the resultant product was mixed with 45 parts of 45% caustic potash.

EXAMPLE V 700 parts of polyphosphoric acid was heated to 50° C. in a 3-necked flask with agitation. A mixture of 100 parts of oxyethylated cocoamine prepared as described in Example I and 300 parts triethanolamine residue was added slowly to the polyphosphoric acid while allowing the reaction mass temperature to increase to 145° C. The temperature was held at 150° C. for 30 minutes, the resultant product then cooled to 100° C. and 525 parts of water added.

EXAMPLE VI 100 parts of the product of Example V was mixed with 50% caustic soda.

EXAMPLE VII 100 parts of oxyethylated cocoamine prepared as described in Example I was mixed with 100 parts of oxyethylated tridecyl alcohol (4.5 moles of ethylene oxide per mole of tridecyl alcohol) and 300 parts triethanolamine residue (Amine N–1) and heated to 50° C. to obtain a solution. This mixture was then added slowly to 830 parts polyphosphoric acid heated to 50° C. in a 3-necked reaction flask with agitation. The temperature was allowed to increase to 140–145° C. for 15 to 20 minutes. The product was then cooled to below 100° C. and mixed with 600 parts water and 50 parts n-propanol.

EXAMPLE VIII

The procedure was the same as in Example VII except that the proportion of polyphosphoric acid was reduced to 700 parts, the amount of oxyethylated cocoamine was reduced to 50 parts and the amount of triethanolamine residue was reduced to 50 parts. The amount of water added at the end was also reduced to 500 parts.

EXAMPLE IX 100 parts of the product of Example VII was mixed with 50 parts of 50% solution of sodium hydroxide.

EXAMPLE X 100 parts of the product of Example VIII was mixed with 50 parts of a 50% solution of sodium hydroxide.

EXAMPLE XI 100 parts of the oxyethylated cocoamine described in Example I, 100 parts of the oxyethylated tridecyl alcohol described in Example VII, 100 parts of oxyethylated glycerine and 300 parts triethanolamine residue (Amine N–1) were mixed and heated to 50° C. to give a clear solution which was then added to 1000 parts of polyphosphoric acid in a 3-necked reaction flask with agitation. The temperature was allowed to rise to 145–150° C. during the addition of the mixture. It was then cooled to below 100° C. and the resultant product was mixed with 500 parts water and 50 parts n-propanol.

EXAMPLE XII 100 parts of the product of Example XI was mixed with 50 parts of 50% aqueous sodium hydroxide.

EXAMPLE XIII 400 parts of polyphosphoric acid was heated to 70° C. and 250 parts of triethanolamine residue (Amine N–1) was added with agitation while maintaining the temperature of the reaction mixture at 100°–110° C. This temperature was maintained during ¾ of the amine residue addition and during the last ¼ of said addition the temperature was increased to 130° C. It was held at 130° C. for thirty minutes.

To 400 parts of this product heated to a temperature of 100° C. in a 3-necked flask there was added 200 parts of an 8–10 carbon atom epoxide having the following formula:

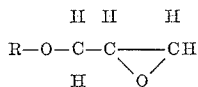

where R equals an 8–10 carbon atom alkyl group (P&G Epoxide No. 7). The epoxide was added gradually and the temperature allowed to increase to 140–145° C. were it was held for 3 hours. The product was then heated to 200° C. and thereafter allowed to cool below 100° C. 300 parts of water were added.

EXAMPLE XIV 350 parts of polyphosphoric acid was heated to 50° C. in a 3-necked flask and there was slowly added with agitation a mixture of 150 parts triethanolamine residue (Amine N–1) and 200 parts of the long chain epoxide described in Example XIII. The temperature was allowed to increase to 135° C. where it was held for thirty minutes. The mixture was then cooled below 100° C. and 400 parts water, 450 parts of 50% aqueous caustic soda and 75 parts n-propanol were added.

EXAMPLE XV 480 parts of oxyethylated ethylene diamine (25.7% ethylene diamine plus 74.3% ethylene oxide), 200 parts of the long chain epoxide described in Example XIII and 3 parts boron trifluoride were added to a 3-necked flask and heated with agitation to 150° C. The product was held at 150° C. for one hour. 100 parts of this product were then added slowly to 300 parts polyphosphoric acid, heated to 50° C. in a 3-necked reaction flask. The temperature was kept below 130° C. until the addition was complete and was then allowed to rise to 130° C. where it was held for 30 minutes. The product was then cooled below 100° C. and mixed with 700 parts water, 100 parts n-propanol and 200 parts 50% aqueous caustic soda solution.

EXAMPLE XVI 200 parts of oxyethylated ethylene diamine made by reacting 3 moles of ethylene oxide with 1 mole of ethylene diamine, 200 parts of the long chain epoxide described in Example XIII, and 2 parts of boron trifluoride were added to a 3-necked reaction flask and heated with agitation to 160–165° C. The mixture was held at this temperature for one hour.

300 parts of polyphosphoric acid heated to 50° C. was addded slowly to 200 parts of the previously prepared product while keeping the temperature below 130° C. When all the acid had been added, the mixture was stirred for thirty minutes and then cooled and mixed with 200 parts water, 50 parts n-propanol and 250 parts 50% aqueous caustic soda.

EXAMPLE XVII

The procedure was the same as in Example XVI except that 600 parts of the product prepared from the oxyethylated ethylene diamine and the long chain epoxide were reacted with 900 parts of the polyphosphoric acid and the resultant mixture was mixed with 150 parts n-propyl alcohol and 600 parts water.

EXAMPLE XVIII 100 parts of the product of Example XVII was mixed with 50 parts ammonium hydroxide.

EXAMPLE XIX 100 parts of the product of Example XVII was mixed with 60 parts of Amine C–6 and 10 parts water.

EXAMPLE XX 100 parts of the product of Example XVII was mixed with 60 parts triethanolamine residue (Amine N–1) and 10 parts water.

EXAMPLE XXI 100 parts of the product of Example XVII was mixed with 50 parts Polyamine H solids and 35 parts water.

EXAMPLE XXII 200 parts of a product made by reacting 3 moles ethylene oxide with one mole cocoamine was mixed with 20 parts of 99% acetic acid. 100 parts of n-propyl alcohol was added and the resultant mixture was then added to 450 parts of polyphosphoric acid while keeping the temperature below 130° C. during the addition. The temperature was then maintained at 130° C. for 30 minutes. The mixture was cooled and thereafter 200 parts of water were added.

EXAMPLE XXIII 300 parts of the product of Example XXII was mixed with 120 parts of 50% aqueous caustic soda.

EXAMPLE XXIV

The procedure was the same as in Example XXII except that 25 parts of 99% acetic acid was used instead of 20 parts and 550 parts of polyphosphoric acid was used instead of 450 parts. The polyphosphoric acid was added slowly while keeping the reaction mass temperature below 110° C. When all of the acid had been added, the temperature was held at 110° C. for 15 minutes. 75 parts of triethanolamine residue (Amine N–1) were then added.

EXAMPLE XXV 600 parts of the product of Example XXIV were mixed with 500 parts water.

EXAMPLE XXVI 100 parts of the product of Example XXV were mixed with 25 parts of 50% aqueous caustic soda.

EXAMPLE XXVII 200 parts of the product of Example XXV were mixed with 45 parts ammonium hydroxide.

EXAMPLE XXVIII 200 parts of the product of Example XXV were mixed with 85 parts Amine C–6.

EXAMPLE XXIX 100 parts of the product of Example XXV were mixed with 45 parts of a 45% aqueous solution of ground caustic potash.

EXAMPLE XXX 100 parts of the product of Example XXV were mixed with 20 parts magnesium carbonate.

EXAMPLE XXXI 100 parts of the product of Example XXV were mixed with 50 parts Polyamine H solids, 20 parts water, and 5 parts n-propanol.

EXAMPLE XXXII 100 parts of the product of Example XXV were mixed with 50 parts of diethylene triamine.

EXAMPLE XXXIII 100 parts of the product of Example XXV were mixed with 50 parts of crude amine residue.

EXAMPLE XXXIV 100 parts of the product of Example XXV were mixed with 50 parts Amine AL–1 and 10 parts water.

EXAMPLE XXXV 225 parts of oxyethylated cocoamine made by reacting 6 moles of ethylene oxide with one mole of cocoamine were mixed with 30 parts 99% acetic acid and to the mixture there was added 100 parts n-propyl alcohol. To the resultant mixture 550 parts of polyphosphoric acid were added slowly while keeping the reaction temperature below 100° C. When all of the acid has been added, the mixture was stirred for 15 minutes and 75 parts triethanolamine residue (Amine N-1) were added while keeping the temperature below 100° C. The mixture was then stirred for 30 minutes and 815 parts of water were added.

EXAMPLE XXXVI 225 parts of a long chain fatty amine (Formonyte 801) oxyethylated with 6 moles per mole of said amine of ethylene oxide were mixed with 30 parts 99% acetic acid, 100 parts n-propyl alcohol, and 120 parts of oxyethylated glycerine prepared by reacting equal parts of glycerine and ethylene oxide in the presence of 0.1% by weight of ground caustic potash. To this mixture there were added slowly while keeping the reaction temperature below 100° C., 600 parts of polyphosphoric acid. After all of the acid has been added, the mixture was stirred for 30 minutes and 75 parts of triethanolamine residue (Amine N-1) were added. The mixture was again stirred for 30 minutes and 960 parts of water were added.

EXAMPLE XXXVII 100 parts of the product of Example XXXV were mixed with 50 parts of triethanolamine residue (Amine N-1).

EXAMPLE XXXVIII 10 parts of the product of Example XXXVI were mixed with 35 parts of triethanolamine residue (Amine N-1).

EXAMPLE XXXIX 100 parts of the product of Example XXXVI was mixed with 25 parts of an oxyalkylated long chain amine (Formonyte 801 plus 6 moles of ethylene oxide per mole of said amine), 25 parts of water and 25 parts triethanolamine residue (Amine N-1).

EXAMPLE XL

The procedure was the same as in Example XXXIX except that 55 parts of the oxyethylated amine were employed, together with 55 parts of water and no triethanolamine residue.

EXAMPLE XLI 100 parts of the product of Example XXV were mixed with 50 parts of Amine C-6.

EXAMPLE XLII 100 parts of the product of Example XXV were mixed with 15 parts of oxyethylated long chain amine (1 mole of Formonyte 801 plus 6 moles ethylene oxide), 15 parts water and 40 parts Amine C-6.

EXAMPLE XLIII 200 parts oxyethylated long chain amine (1 mole Formonyte 801 plus 3 moles ethylene oxide), 25 parts 99% acetic acid, 100 parts n-propyl alcohol and 120 parts oxyethylated glycerine (equal parts of ethylene oxide and glycerine) were mixed and 600 parts polyphosphoric acid were added thereto while keeping the temperature below 105° C. When all the acid had been added, the mixture was stirred for 30 minutes and 75 parts of Amine N-1 were added while keeping the temperature below 105° C. When all of the Amine N-1 had been added, the mixture was stirred for 30 minutes, cooled and 1120 parts of water were added.

EXAMPLE XLIV 100 parts of the product of Example XLIII were mixed with 25 parts 50% aqueous caustic soda.

EXAMPLE XLV 200 parts of the product of Example XLIII were mixed with 100 parts of Amine C-6.

EXAMPLE XLVI 200 parts of the product of Example XLIII were mixed with 80 parts of Amine C-6.

EXAMPLE XLVII 270 parts of oxyethylated long chain amine (1 mole Formonyte 801 plus 3 moles ethylene oxide), 40 parts 99% acetic acid, 60 parts n-propyl alcohol and 300 parts of oxyethylated glycerine (equal parts of ethylene oxide and glycerine), were mixed and 900 parts polyphosphoric acid were slowly added thereto while keeping the temperature below 110° C. After all of said acid had been added, the mixture was stirred at 100° C. for 30 minutes. It was then cooled to 90° C. and 100 parts triethanolamine residue (Amine N-1) were added while keeping the temperature below 110° C. The mixture was then stirred again for 30 minutes at 100° C., cooled to 90° C. and 500 parts of water added.

EXAMPLE XLVIII 100 parts of the product of Example XLVII were mixed with 60 parts Amine C-6 and 85 parts water.

EXAMPLE XLIX 100 parts of the product of Example XXV were mixed with 25 parts long chain amine (Formonyte 801) and 25 parts n-propanol.

The phosphate esters previously described were evaluated as scale inhibitors in various amounts, heating the brine for a predetermined period and then determining the amount of calcium carbonate or calcium sulfate retained in solution.

A brine containing calcium carbonate was prepared by adding to distilled water 5180 milligrams per liter (mg./l.) $NaHCO_3$, 22,200 mg./l. NaCl, 6 mg./l. $Na_2SO_4$, 366 mg./l. $MgCl_2 \cdot 6H_2O$, and 2000 mg./l. $CaCl_2$. The water was sparged with carbon dioxide for 30 minutes before the salts were added and again for 30 minutes after the addition of the salts. This composition is hereinafter referred to as Brine A.

To prepare a brine for testing against calcium sulfate, two separate brines were prepared. The first, Brine B, was made by dissolving 7.5 grams of sodium chloride and 8.33 grams of calcium chloride in distilled water sufficient to make one liter. The second, Brine C, was made by dissolving 7.5 grams of sodium chloride, plus 10.66 grams $Na_2SO_4$ in distilled water sufficient to make one liter. These two brines were then mixed in equal parts and the tests were carried out with the addition of various proportions of the chemicals to be tested. These tests were made at various temperatures over predetermined periods of time. The amount of calcium sulfate in solution was determined at the end of each test. Some tests were made under static conditions and others with agitation.

The following examples illustrate the results obtained.

EXAMPLE L

In this test Brine A was used at a temperature of 160° F. for 20 hours in a static system, i.e., without agitation. The blank contained 1800 mg./l. of calcium carbonate at the beginning of the test. When no chemical was added, 480 mg./l. of calcium carbonate was retained in solution at the end of the test. The addition of 2.5 parts per million (p.p.m.) of each of the compositions of Examples VI, IX, X and XII caused all of the calcium carbonate to be retained in solution.

EXAMPLE LI 50 ml. of Brine B and 50 ml. of Brine C were mixed together and used as a test medium for calcium sulfate precipitation at 160° F. for 24 hours without agitation. A control or blank at the beginning of the test contained 4200 mg./l. calcium sulfate, calculated as clacium carbonate. At the end of the test, the control contained 2500 mg./l. calcium sulfate, calculated as calcium carbonate. The addition of 1 p.p.m. of the compositions of Examples XXV, XXVIII, XXXV, XXXVI, XLI and XLII caused the retention of 4200, 4200, 3200, 3700, 4100 and 3800 mg./l. of calcium sulfate, calculated as calcium carbonate. The addition of 3 p.p.m. and of 5 p.p.m. of each of said compositions caused the retention of all of the calcium sulfate, calculated as calcium carbonate.

The hydroxy amine used in preparing the phosphate ester should preferably contain more than one hydroxyl group. For some unexplained reason, compounds made from amines containing more than one hydroxyl group, and especially those containing at least 2 and up to 6 hydroxyl groups, are more effective and can be used at lower dosages. The hydroxyl group of the amine is preferably separated from a nitrogen atom of the amine by 2 to 6 carbon atoms, e.g., an alkylene group such as ethylene, propylene, butylene, and homologues. While the dosage of the phosphate ester will normally be within the range of 0.5 to 100 p.p.m., certain types of uses may require higher dosages even as high as 200 to 500 p.p.m.

While the phosphate esters in the examples have been prepared by using a commercial grade of polyphosphoric acid, also called "115% phosphoric acid," it will be understood that the reaction can also be carried out with phosphorous pentoxide or with a mixture of polyphosphoric acid and phosphorus pentoxide.

The compositions of the invention are especially effective in the inhibition of scaling on metal surfaces by calcium sulfate, barium sulfate, and calcium carbonate. They are useful in industry to prevent deposits of these scale-producing compounds on metal surfaces of pumps, pipes, valves, tanks, and the like when waters containing the scale-producing compounds (or precursors thereof, e.g., calcium bicarbonate) are treated in the concentrations aforesaid, i.e., 0.5 to 100 parts per million. Places where scale build up is most likely to become troublesome are those in the liquid handling systems wherein there is a change in fluid pressure, a change in fluid temperature, or a change in fluid flow rate.

The invention has utility in the prevention of similar scale deposits occurring in closed and once-through cooling systems where hard water is employed.

The compounds may also have utility in boiler feedwaters and in waters charged to certain desalinization equipment where scale deposition is a problem.

The invention may also be used in the prevention of scale deposits in certain effluent and disposal waters, particularly where other materials used in the prevention of such deposits may constitute a pollution problem.

In a number of oil fields in West Texas and other areas, water floods have been established in which waters incompatible with the connate waters were used for injection. This occurs when a good source of compatible water is not available. Most of these floods are using a high sulfate water to flood a formation which has a high calcium content water. As the waters reach the producing well they mix, and a calcium sulfate deposition occurs, either in the formation at the well bore or in the producing equipment. This requires the removal of the tubing, rods and pump for cleaning, and a fracturing job if the formation is plugged, which is the case most of the time. By the practice of the present invention the formation of scale in the producing equipment and underground formation can be reduced or prevented.

Similarly, the invention is applicable to the treatment of water supply wells. The phosphate esters can also be added directly to the input well of a waterflood system consisting of one or more input wells and one or more producing wells.

An important feature resides in the fact that the compositions of the invention are effective in inhibiting the precipitation of hardness components of water, such as calcium, when such compositions are used in what is commonly referred to as threshold amounts, i.e., usually 1 to 3 parts per million and not more than 9 parts per million. These amounts are far less than normally required to sequester or chelate the calcium.

Another important feature is the stability of the compositions against hydrolytic action at high temperatures. For example, they can be used to inhibit scale formation in water or brines at 200–300° F. where inorganic polyphosphates are relatively unstable. They can also be used under conditions where much higher temperatures are employed, for instance, in water or brines which are heated by submerged combustion.

In addition, the compositions of the invention can act as corrosion inhibitors in corrosive waters and brines.

The compounds which are described by trade name have the following compositions:

(1) Formonyte 801 is N-cocotrimethylene diamine (2) Amine C-6, obtained as a co-product from a commercial continuous operation, is a clear, dark-amber liquid composed primarily of a mixture of aliphatic and heterocyclic mono- and diamines. The morpholinyl ring is the dominant heterocyclic group present, and the oxyethylene linkage appears very frequently in the various compounds present. Amine C-6 is completely miscible with water. The principal components of Amine C-6 are 4-(2-aminoethoxy) ethyl morpholine, 2-(4-morpholinylethoxy) ethanol and bis-2-(4-morpholinyl) ethyl ether.

(3) Amine Al-1 is a mixture of N-aminoethyl-piperazine, N-hydroxyethylpiperazine, N - aminoethylethanolamine and higher homologues of these compounds. The mixtures has a total nitrogen content of 29.7–30.8% and a titratable amine content of 16.4 meq./gm.

(4) Polyamine H solid is a mixture of polyethylene polyamines of the series $H_2N-(RNH)_xH$ wherein the polyethylene polyamines are higher homologues than tetraethylene pentamine.

The invention is hereby claimed as follows:

1. A process for preventing scale deposits of at least one of barium sulfate, calcium sulfate, and calcium carbonate from water containing said scale-forming chemicals which comprises adding to said water an effective scale inhibiting amount of a phosphate ester of a surface active hydroxy amine in which the hydroxyl groups of the amine are connected to a nitrogen atom of the amine through at least one carbon atom, said amine contains eight to eighteen carbon atoms in a hydrocarbon group, and the phosphate ester groups consist essentially of one or both of a member selected from the group consisting of

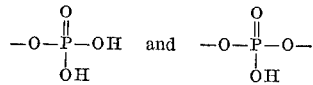

2. A process as claimed in claim 1 wherein said amine is 0.5 to 100 parts per million parts of said water.

3. A process as claimed in claim 1 in which said ester is at least partially in the form of a salt thereof.

4. A process as claimed in claim 1 wherein said water is a natural hard water or brine.

5. A process as claimed in claim 1 in which said hydroxy amine contains at least two hydroxyl groups which are connected to one or more nitrogen atoms of said amine through alkylene groups containing 2 to 6 carbon atoms.

6. A process as claimed in claim 1 in which said hydroxy amine contains at least two hydroxy ethyl groups.

7. A process as claimed in claim 1 in which said phosphate ester is a mixed ester of polyphosphoric acid with said hydroxy amine and at least one hydroxy hydrocarbon containing 3 to 18 carbon atoms in a hydrocarbon group.

8. A process as claimed in claim 1 in which said hydroxy amine is a surface active oxyethylated fatty amine.

9. A process as claimed in claim 1 in which said phosphate ester is added to water used in a waterflood system for oil wells.

10. A process as claimed in claim 1 in which said phosphate ester is added to a water heated by submerged combustion.

References Cited

UNITED STATES PATENTS

| | | | |
|---|---|---|---|
| 3,004,056 | 10/1961 | Nunn Jr., et al. | 260—944 |
| 3,346,670 | 10/1967 | Papalos | 260—944 |
| 3,380,927 | 4/1968 | Edelstein et al. | 260—944 |
| 3,462,365 | 8/1969 | Vogelsang, Sr. | 252—84 |

LEON D. ROSDOL, Primary Examiner

W. E. SCHULZ, Assistant Examiner

U.S. Cl. X.R.

210—58; 252—84, 180